No. 750,847. Patented February 2, 1904.

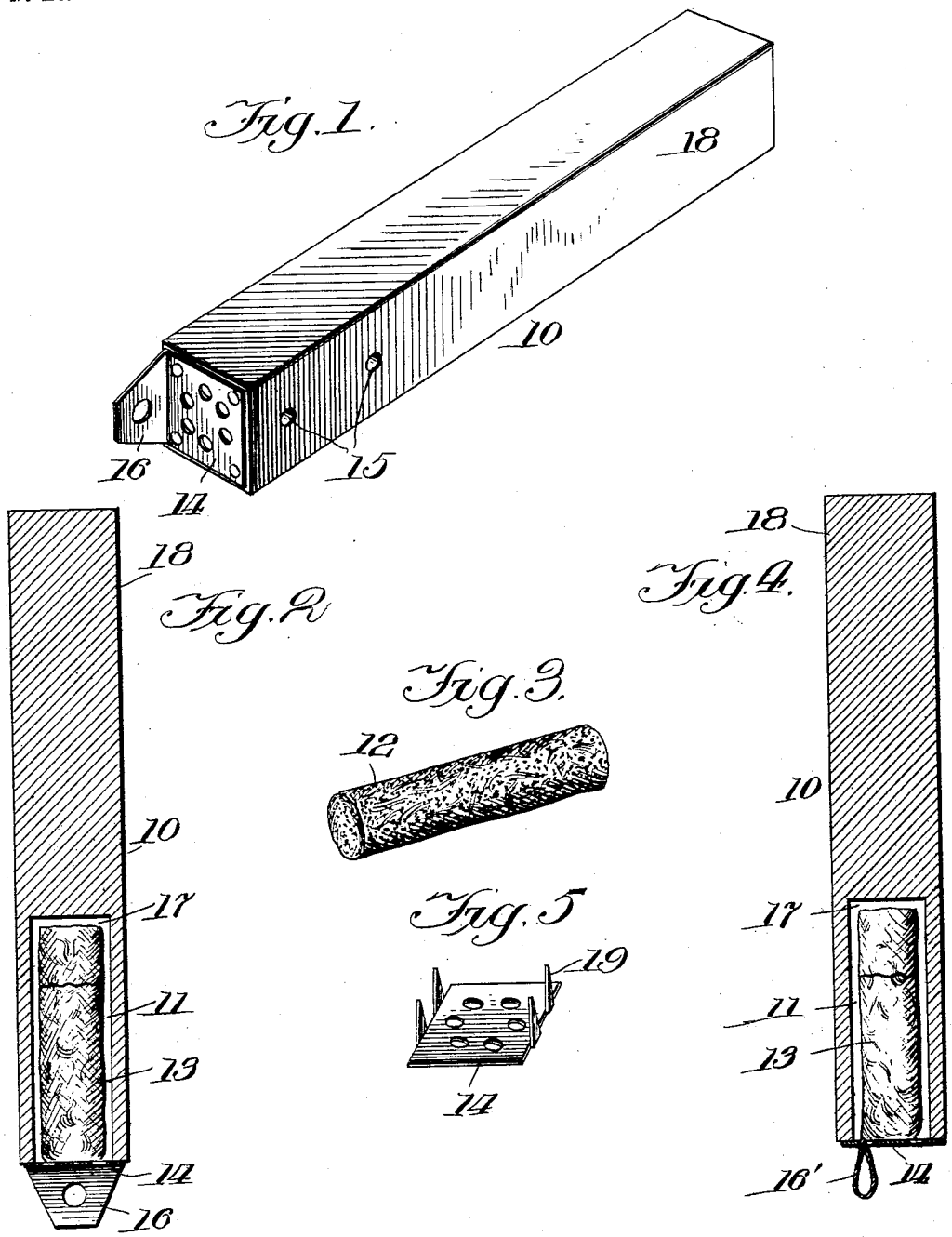

UNITED STATES PATENT OFFICE.

CHARLES R. GROFF, OF ST. PAUL, MINNESOTA, ASSIGNOR, BY MESNE ASSIGNMENTS, TO THE LAUNDRY BLUE COMPANY, OF CHICAGO, ILLINOIS, A CORPORATION OF ILLINOIS.

BLUING DEVICE.

SPECIFICATION forming part of Letters Patent No. 750,847, dated February 2, 1904.

Application filed October 20, 1903. Serial No. 177,743. (No model.)

*To all whom it may concern:*

Be it known that I, CHARLES R. GROFF, a citizen of the United States, residing at St. Paul, in the county of Ramsey and State of Minnesota, have invented certain new and useful Improvements in Bluing Devices, of which the following is a specification.

This invention relates to a novel bluing device; and its object is to provide a simple, effective, and inexpensive device for holding bluing or other soluble coloring material and adapted to be shaken in the water to color it.

Further objects are to insure perfect solubility of the coloring material, to prevent the coloring material from soiling the hands while in use, or dripping out of the device or freezing after it has been used.

In the accompanying drawings, Figure 1 is a perspective view of a bluing device embodying the invention. Fig. 2 is a longitudinal section thereof. Fig. 3 is a perspective view of a load of bluing material as used with my device. Fig. 4 illustrates another form of hanger. Fig. 5 shows the cover provided with prongs.

In the drawings like numerals of reference designate corresponding parts in the several figures, and referring thereto, 10 is the body, made of wood or other suitable material and provided at one end with a longitudinal chamber 11. The bluing 12 is preferably made in a more or less solid form, as shown in Fig. 3, and inclosed within a retarding agent to insure perfect solubility and prevent the escape of the bluing in particles into the water. This retarding agent can be cheaply made from reticulated fabric in the form of a sack 13, which entirely surrounds the load of bluing, as shown in Fig. 2. A perforated cover 14 is fastened over the chamber, and transverse openings 15 are provided in the side of the body communicating with the chamber therein. The perforated cover may be provided with a hanger 16, as shown in Fig. 2, or a loop-hanger 16' may be connected with the load of material and project through the perforated cover, as shown in Fig. 4. The openings in the handle are located at a distance from the end 17 of the chamber, so that any liquid left in the chamber after the device has been used will be held therein below said openings, and thus prevent dripping when the device is hung up by the hanger.

In practice the upper part 18 of the body, which forms a handle, is grasped in the hand and the end containing the coloring material is stirred in the water until the water is colored as desired. The water enters the chamber principally through the side openings and flows out through the perforated cover, and thus a complete circulation of the water around the bluing and through the chamber is obtained. The reticulated fabric insures perfect solubility of the bluing by preventing any particles thereof from passing out of the device into the water, and, furthermore, this fabric confines the bluing so that it is prevented from wholly disintegrating while being agitated in the water.

The cover 16 may be provided with prongs 19 to enter the body and fasten the cover in place or other fastening means may be employed.

I claim—

1. A bluing device consisting of a body having one end thereof adapted to form a handle and a chamber in its other end to receive a load of bluing, an inclosure of reticulated material surrounding said bluing, and a perforated cover over the end of the chamber, said body being provided with transverse openings communicating with said chamber to permit a circulation of water through the chamber and around the load of bluing.

2. A bluing device consisting of a body having one end thereof adapted to form a handle and a chamber in its other end, a cover fastened to the body over said chamber, said body and cover being provided with openings communicating with the chamber to enable a circulation of water through the chamber, and a sack of reticulated material containing bluing arranged in said chamber.

3. A bluing device consisting of a body made of a single piece of material and having one end adapted to form a handle and a chamber in its other end, a sack of reticulated material containing a load of bluing and adapted to be held in said chamber, a cover fastened on the body over said chamber, said cover and side of the body being provided with openings which communicate with said chamber.

4. A bluing device consisting of a body having one end thereof adapted to form a handle and a chamber in its other end to receive a load of bluing, a perforated cover fastened to the body over the end of said chamber, and a hanger device at the chambered end of the body.

5. A bluing device consisting of a body having one end thereof adapted to form a handle and a chamber in its other end, a sack of reticulated material containing a load of bluing and adapted to be held in said chamber, a cover fastened on the body over the end of said chamber, said cover and side of the body being provided with openings which communicate with the chamber, and a loop-hanger at the chambered end of the body.

CHARLES R. GROFF.

Witnesses:
F. G. BRADBURY,
GORDON M. GROFF.